Figure 4:
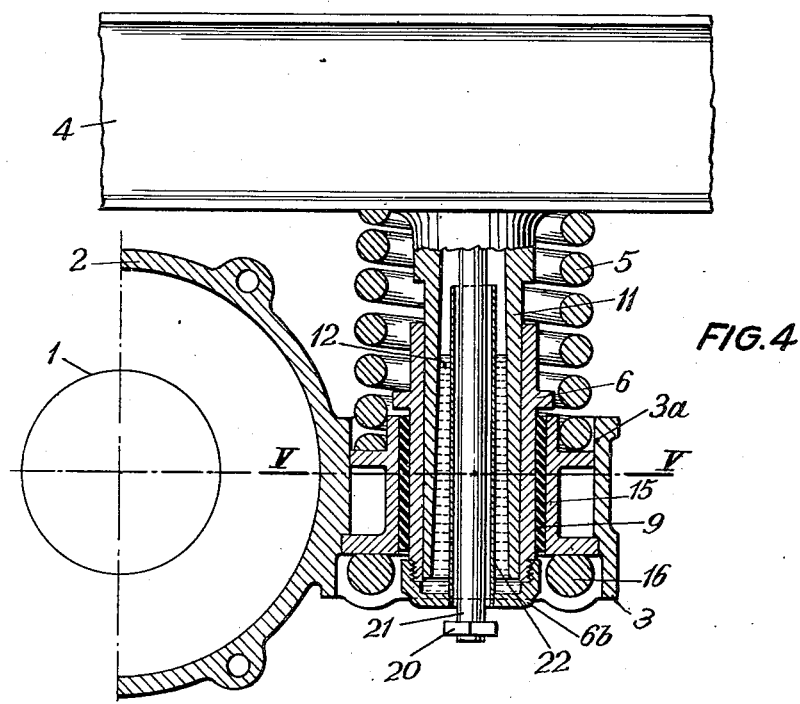

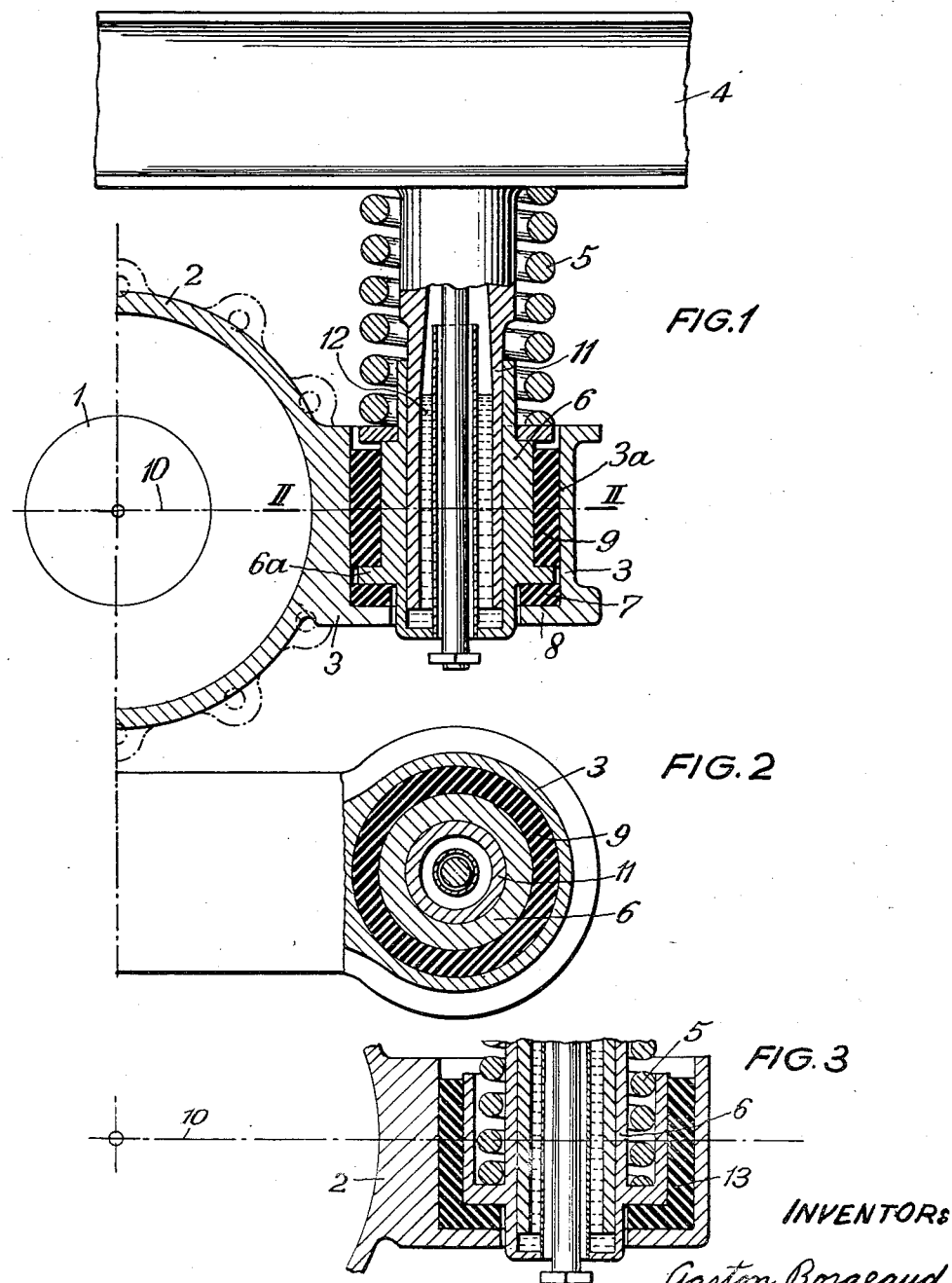

Sept. 11, 1951  G. BORGEAUD ET AL  2,567,469
AXLE-BOX SPRING MOUNTING FOR RAIL VEHICLES
Filed July 24, 1947  2 Sheets-Sheet 2

INVENTORS
Gaston Borgeaud
Jakob Waldvogel
by Sommers & Young
Attorneys

Patented Sept. 11, 1951

2,567,469

UNITED STATES PATENT OFFICE 2,567,469

AXLE-BOX SPRING MOUNTING FOR RAIL VEHICLES

Gaston Borgeaud and Jakob Waldvogel, Winterthur, Switzerland

Application July 24, 1947, Serial No. 763,322
In Switzerland February 8, 1943

Section 1, Public Law 690, August 8, 1946
Patent expires February 8, 1963

4 Claims. (Cl. 267—33)

Our invention relates to improvements in axle-box spring mountings of rail vehicles, in which the axle box on both sides is provided with arms which take up the load from the frame through springs and which are vertically guided in metallic bushes mounted therein on studs fixed to the frame.

It is known in axle mountings of the type indicated to damp the longitudinal and transverse shocks by inserting flat plate-like rubber cushions between the guide bushes and arms of the axle box in order to elastically transmit these shocks to the frame. In spite of such measures, however, edge pressures are liable to arise on the guide bushes, and also a non-uniform loading of the springs, as the horizontal forces are transmitted from the axle-box arms to the guide bushes on the lower end of the latter, i. e. below the contact face of bush and stud, and the axle box is subjected to a tilting moment by longitudinal and transverse forces which engage the axle-box arms below the level of the axle center. Such phenomena result in undue wear of the cylindrical guides and a one-sided loading of the elastic cushions.

The object of our present invention is to eliminate such drawbacks by forming the elastic cushions which are inserted between the axle box arms and the vertical guide bushes as sleeves which, embracing the vertical guide bushes, contact the wall of vertical bores provided in the arms, and extend above and below the level of the axle center.

Such arrangement not only permits to eliminate the tilting moment which acts onto the axle box due to horizontal forces, but also to shorten the guide portion depending from the frame. Obviously, the advantage of known arrangements with respect to the elastic transmission of shocks acting longitudinally and transversely and of compensating small inaccuracies of assembling also apply to the arrangement according to our present invention.

In such arrangement of the elastic sleeves, the guide bush is liable to slightly move relatively to the axle-box arm, in accordance with the elasticity of the said sleeve, thus causing a wear of the bearing surface of the guide bush on the axle-box arm. When, however, an elastic ring is inserted between bush and arm, the ring is subjected to an excessive bearing pressure by the spring load.

With a view of eliminating such wear and excessive bearing pressure, the elastic sleeves in another form of our invention do not contact directly the walls of the axle-box arm bores but the inside walls of metallic bearing on bushes inserted between the said sleeves and the surfaces of said arm bores, which bushes transmit the spring load to the arms, the guide bushes thus being relieved from such function.

Various forms of our invention are illustrated by way of example in the accompanying drawings, in which—

Figure 5:
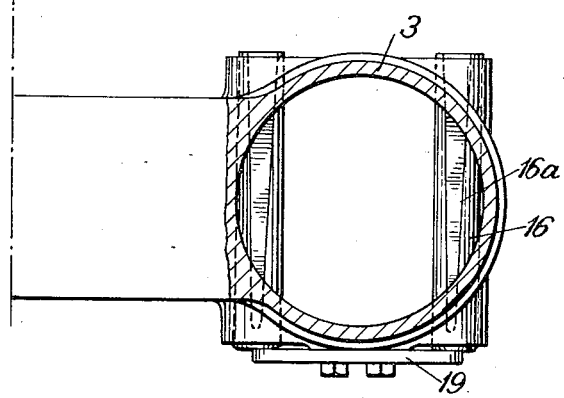

Fig. 1 shows a sectional elevation of half an axle-box mounting according to a first embodiment, Fig. 2 a sectional plan view on the line II—II in Fig. 1, Fig. 3 a modification thereof, Fig. 4 a view similar to Fig. 1, but of a second embodiment, and Fig. 5 a cross-section of the axle-box arm on the line V—V in Fig. 4.

In the example according to Figs. 1 and 2 a roller bearing (not shown) is mounted between axle journal 1 and axle box 2. The axle box (of which only the right hand portion is shown) has on both sides arms 3 integral therewith and provided with cylindrical bores 3a. The load of the vehicle subframe 4 is transmitted, through springs 5 to a bush 6, the foot flange 6a of which rests on a base flange 8 of arm 3 through the intermediary of an elastic ring 7. The inner face of bush 6 is guided on a vertical stud 11 which is fixed to the vehicle frame, and is lubricated by an oil bath provided in space 12, while the outer face of bush 6 is retained in bore 3a of arm 3 (e. g. in the manner of "silent blocks" known in the art) through the intermediary of an elastic sleeve 9.

A horizontal plane 10 passing through the axle center forms a plane of symmetry for elastic sleeve 9, which extends above and below plane 10. The same also applies to the bearing face of bush 6 on guide stud 11. Forces acting in the said horizontal plane on axle box 2 thus are transmitted at the same level to the guide elements 6 and 11 so as to prevent the formation of a couple of forces acting on the axle box and the setting up of edge pressures on the guide elements which otherwise would be set up when the center of sleeve 9 were situated below the center of axle 1. If, for some reason or other, the two springs 5 of the axle-box mounting should yield non-uniformly, the inclination of the said mounting (which would give rise to edge pressures on the faces of guide elements 6 and 11) is counteracted, for the most part, by the elastic sleeve 9.

Fig. 3 shows how the spring 5 may be depressed into bush 6, which permits of lowering subframe 4 and shortening stud 11. Further, modifying the arrangement shown in Fig. 1, sleeve 9 and ring 7 are united into a single rubber member 13.

In the example according to Figs. 4 and 5, a metallic bearing bush 15 is a sliding fit in the cylindrical bore 3a of arm 3. Said bush 15 is loaded from above by frame 4 through spring 5 and bears on flattened faces 16a of the horizontal pins 16 which are mounted in the arms 3. The spring load, however, also may be transmitted by means of bush 15 on to the base flange 8 of arm 3 as shown in Fig. 1, or to a base cap bolted to the underside of arm 3. An elastic sleeve 9 is put between bush 6 which is guided on the vertical hollow stud 11 of frame 4, and metallic bush 15.

By providing a separate bush 15, the undesirable chafing is avoided on the horizontal seats which support the spring load. Such arrangement, further, has the advantage of avoiding deformations of the bush 6 (Fig. 1) by the spring load, and rubbing and pitting at various points of the vertical guide bush 6.

In the arrangement shown in Figs. 4 and 5, the rubber sleeves 9 directly contact the guide bush 6 and the bearing bush 15. Metallic bushes, however, could be vulcanized to the sleeves 9 on their outside, which bushes in their turn contact the guide bush and the bearing bush, or, respectively, are secured to the bushes 6 and 15. A collar or ring 20 on the end of a pin 21 which is rigidly secured to frame 4, serves as a stop or detent for the axle-box suspension gear in the event that the rail vehicle has to be lifted off the track for assembling purposes. A tube 22, secured to bush 6 or to a cap 6b (which is screwed to bush 6) serves as partition for the lubricating oil bath 12.

What we claim and desire to secure by Letters Patent is:

1. An axle-box spring mounting on the underframe of rail vehicles, comprising an axle-box in which the axle is journaled, said axle-box having on each side a horizontal arm integral therewith, the free-end portion of each said arm being provided with a vertical bore, a hollow vertical stud fixed to said frame on each side of the axle box and projecting into the respective bore, helical springs interposed between said frame and the respective arms for transmitting the pressure from said frame onto said arms and axle box, metallic bushes each inserted into the respective said two bores and closed at their lower ends to form a lubricating-oil bath, the said bushes slidably engaging the said studs, and rubber bushes each surrounding the respective metallic bushes and located in the bores of said arms, said studs as well as the rubber bushes extending above and below the level of the axle center.

2. An axle-box spring mounting as defined in claim 1, and in which the springs bear on the metallic bushes.

3. An axle-box spring mounting according to claim 1, and in which the said metallic bushes are recessed for accommodating the lower ends of said springs.

4. An axle-box spring mounting as defined in claim 1, and in which a load-transmitting bush is disposed between each said rubber bush and the wall of the bore in each said arm, and the said springs bear on the said load-transmitting bushes.

GASTON BORGEAUD.
JAKOB WALDVOGEL.

REFERENCES CITED

The following references are of record in the file of this patent:

UNITED STATES PATENTS

| Number | Name | Date |
|---|---|---|
| Re. 21,612 | Williams | Oct. 29, 1940 |
| 1,961,536 | Thiry | June 5, 1934 |
| 2,356,962 | Williams | Aug. 29, 1944 |

FOREIGN PATENTS

| Number | Country | Date |
|---|---|---|
| 175,220 | Switzerland | Feb. 15, 1935 |
| 175,221 | Switzerland | Feb. 15, 1935 |
| 365,962 | Italy | Dec. 16, 1938 |